UNITED STATES PATENT OFFICE.

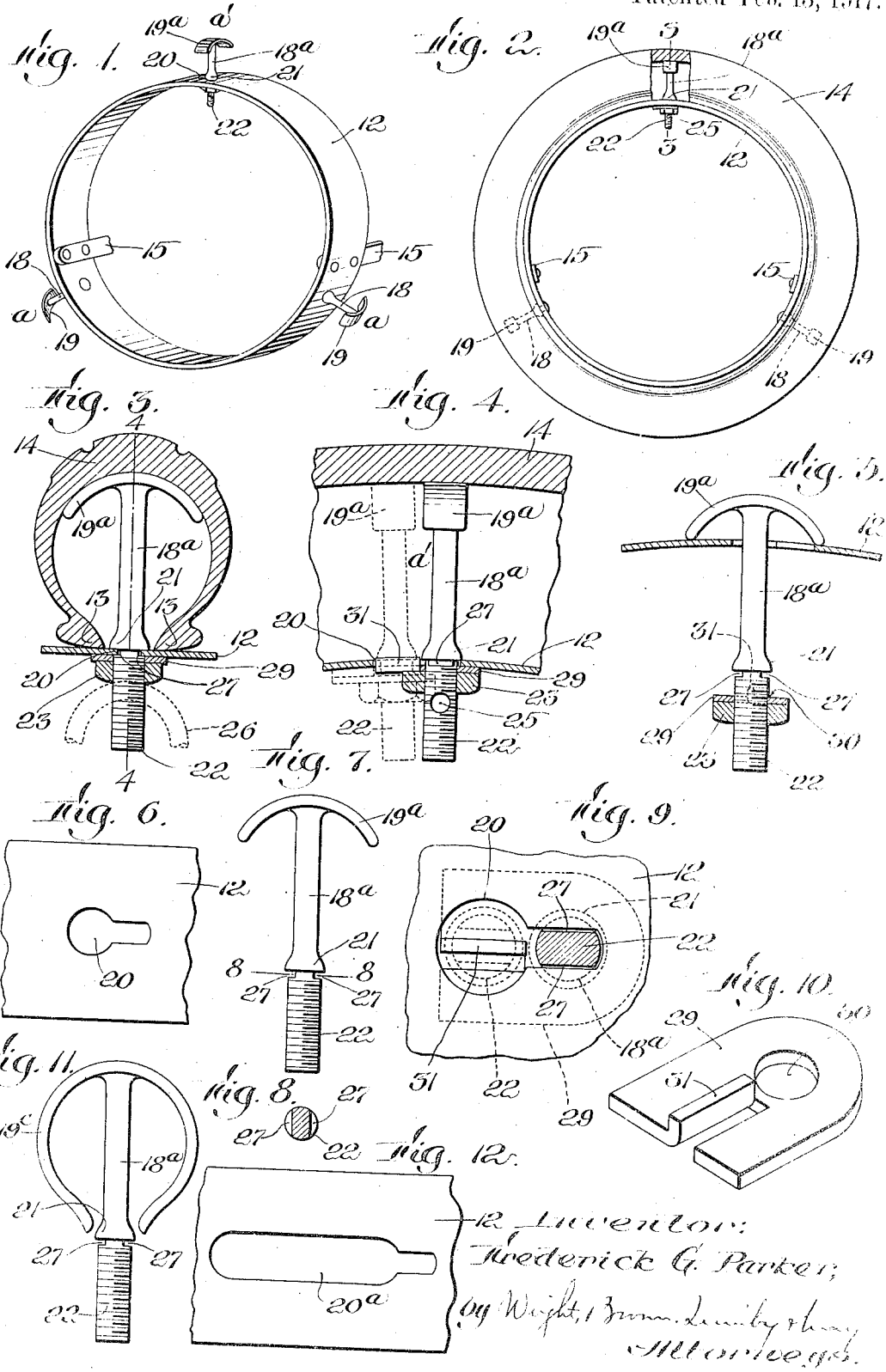

FREDERICK G. PARKER, OF PORTLAND, MAINE.

SPARE-TIRE CARRIER.

1,215,976.  Specification of Letters Patent.  Patented Feb. 13, 1917.

Application filed August 21, 1916. Serial No. 115,948.

*To all whom it may concern:*

Be it known that I, FREDERICK G. PARKER, a citizen of the United States, residing at Portland, in the county of Cumberland and State of Maine, have invented new and useful Improvements in Spare-Tire Carriers, of which the following is a specification.

This invention relates to a carrier adapted to be mounted on the body of an automobile and to support a spare tire shoe or carcass which is not connected with a demountable rim, the space between the edges of the shoe being open.

The invention has for its object to provide a carrier for a tire of this class adapted to firmly support the tire without exerting distorting pressure thereon, the supported tire being permitted to retain its exact normal shape and being free from liability to be chafed, worn or otherwise injured.

The invention also has for its object to exclude moisture and dirt from the interior of the stored tire.

The invention also has for its object to enable the tire to be quickly and conveniently applied to and removed from the carrier and securely held and locked if desired so that it cannot be fraudulently removed. To this and other related ends the invention consists in the improvements which I will now proceed to describe and claim.

Of the accompanying drawings forming a part of this specification;

Figure 1 represents a perspective view of a tire carrier embodying my invention;

Fig. 2 represents an end or edge view of a carrier and a tire supported thereby;

Fig. 3 represents a section on line 3—3 of Fig. 2;

Fig. 4 represents a section on line 4—4 of Fig. 3;

Fig. 5 represents a view similar to a portion of Fig. 4, showing one of the rest members hereinafter described displaced from its operative position;

Fig. 6 represents a side view of a portion of the annular seat hereinafter referred to;

Fig. 7 represents a side view of the displaceable member detached;

Fig. 8 represents a section on line 8—8 of Fig. 7;

Fig. 9 represents an enlargement of a portion of Fig. 6 and the portion of the displaceable member shown by Fig. 8 associated therewith;

Fig. 10 represents a perspective view of the locking washer hereinafter referred to;

Fig. 11 represents a view similar to Fig. 7, and

Fig. 12 represents a view similar to Fig. 6, these views illustrating modifications.

The same reference characters indicate the same or similar parts in all the views.

In the drawings, 12 represents an annular seat formed to support the edges 13 of a tire shoe or carcass 14, said seat being preferably a cylindrical band of sheet metal of any suitable thickness, and provided with means whereby it may be secured to any desired part of an automobile body, said means as here shown being embodied in arms or shanks 15 riveted to the seat 12 and adapted to be connected by means not shown with the automobile body.

The seat 12 supports a series of rest members, which project outwardly from the periphery of the seat and are adapted to extend through the opening between the edges of the shoe and to bear on the inner surface of the tread portion of the shoe, said members collectively constituting a collapsible rest.

In the preferred embodiment of my invention here shown three rest members are provided, these being designated by the reference letters $a$, $a$ and $a'$ in Fig. 1, the members $a$, $a$, being rigidly and permanently attached to the seat, and the member $a'$ being movably attached, and radially displaceable to enable the rest formed by the series of members to be collapsed or reduced in diameter and loosened for the purpose of releasing the tire, and expanded radially or increased in diameter and positively held to firmly confine the tire.

Each of the members $a$ includes a shank 18 riveted or otherwise firmly secured to the seat 12, and a curved head 19.

The displaceable member $a'$ comprises a shank $18^a$ and a curved head $19^a$. The shanks of the said members radiate from the seat 12 and are formed to enter the space between the tire edges 13, and their curved heads are shaped to conform to the inner surface of the tread portion of the tire, as shown by Fig. 3.

The member $a'$ is so connected with the shoe that it may be displaced inwardly, as shown by Fig. 5, to collapse the rest formed by the series of members and thus permit the shoe to be readily removed and applied. When the member $a'$ is confined in its operative position the three members coöperate in firmly supporting the shoe with its edges 13 bearing closely against the seat 12 so that the seat excludes water and dirt from the interior of the shoe, the shape of the shoe being unchanged, because it is supported without compressive pressure on its exterior.

I will now describe the preferred means for supporting the displaceable member $a'$ and permitting its inward displacement.

The seat 12 is provided with a keyhole slot 20 (Figs. 6 and 9), the major axis of which extends circumferentially of the seat. The shank $18^a$ is provided with an annular shoulder 21 and with a screw-threaded extension 22 which projects through the slot 20 into the space surrounded by the seat. The shoulder 21 is of smaller diameter than the larger portion of the slot 20, and is formed to overlap the edges of the smaller portion of said slot, as indicated in Fig. 3 and by dotted lines in Fig. 9. The screw-threaded extension 22 is provided with a lock nut 23 adapted to be set against the inner surface of the seat 12. When the extension 22 occupies the smaller portion of the slot 20 and the nut 23 is set up against the seat 12 the displaceable rest member is firmly clamped to the seat. When the nut 23 is loosened the displaceable member may be moved laterally, as indicated by dotted lines in Fig. 4, until its shoulder 21 is in position to pass through the larger portion of the slot 20. The displaceable member is then moved endwise inwardly until its head bears upon the seat 12, as shown by Fig. 5. The rest formed by the series of members is now collapsed so that the shoe 14 may be easily removed.

The displaceable member may remain displaced until another shoe is placed upon the seat, said shoe being secured by moving the displaceable member endwise outwardly to the position shown by dotted lines and then laterally to the position shown by full lines in Fig. 4, the nut 23 being again tightened.

To prevent fraudulent removal of the shoe from the seat I provide means for locking the displaceable member $a'$ in its operative position and thus virtually locking the rest formed by the series of members in its expanded condition. To this end I provide the extension 22 with an orifice 25 adapted to receive a padlock hasp 26, shown by dotted lines in Fig. 3, said hasp preventing the loosening of the nut 23 and the displacement of the member $a'$.

It will be seen by comparing Figs. 4 and 5 that when the member $a'$ is displaced inwardly to collapse the rest, it is also turned from its operative position so that its head $19^a$ is in line with the opening between the edges of the shoe, and permits the shoe to be easily removed. To prevent the member $a'$ from being turned when in the operative position shown by Figs. 3 and 4, I provide the shank extension with notches 27 which engage the edges of the narrower portion of the seat slot 20, as best shown by Fig. 3.

To positively lock the displaceable member $a'$ in its operative position and prevent it from being either accidentally or fraudulently forced to the position shown by dotted lines in Fig. 4 I provide means preferably embodied in a locking washer 29 (Fig. 10) having an orifice 30 to receive the extension 22, and an upstanding ear 31 formed and arranged to enter the larger portion of the slot 20, as shown by Figs. 4 and 9, and abut against one end of said slot to prevent lateral movement of the member $a'$ from its operative position.

The heads of the rest members which contact with the inner surface of the shoe may be called lateral enlargements of generally oblong form, their length being considerably greater than the normal width of the space between the edges of the shoe, and their width being such that they are adapted to pass easily through said space when turned into alinement therewith.

The said enlargements may be formed to bear against the side portions of the shoe, as indicated by Fig. 11, which shows the head or enlargement $19^c$ of the displaceable member elongated and extended inwardly at its end portions. In this case the seat 12 may be provided with a slot $20^a$ (Fig. 12), the larger portion of which is elongated to receive the head or enlargement $19^c$ and permit a sufficient inward displacement of the displaceable member. It is obvious that more than one, and, if desired, all of the rest members may be displaceable in the manner described, although I find that one displaceable member is sufficient. I do not intend, therefore, by specifying in the following claims that one of the rest members is displaceable, to limit myself to a structure having only one displaceable member.

Having described my invention, I claim:

1. A spare tire carrier comprising an annular seat for the edges of a tire shoe, having means for engagement with a vehicle body, a series of spaced-apart rest members supported by said seat, and formed to bear on the inner surface of the tread portion of the shoe, said members collectively constituting a radially collapsible rest, and means whereby said rest may be positively maintained in an expanded condition to positively confine the shoe, and contracted and loosened to release the shoe.

2. A spare tire carrier comprising an annular seat for the edges of a tire shoe, having means for engagement with a vehicle body, a series of spaced-apart rest members supported by said seat, and formed to bear on the inner surface of the tread portion of the shoe, said members collectively constituting a radially collapsible rest, and means whereby said rest may be positively maintained in an expanded condition to positively confine the shoe, and contracted and loosened to release the shoe, means being provided for locking the rest in its expanded condition.

3. A spare tire carrier comprising an annular seat for the edges of a tire shoe, having means for engagement with a vehicle body, a series of spaced-apart rest members supported by said seat, and formed to bear on the inner surface of the tread portion of the shoe, said members collectively constituting a radially collapsible rest, and means whereby said rest may be positively maintained in an expanded condition to positively confine the shoe, and contracted and loosened to release the shoe, said seat being formed to cover the opening between the shoe edges and exclude rain and dirt from the interior of the shoe.

4. A spare tire carrier comprising an annular seat for the edges of a tire shoe, having means for engagement with a vehicle body, and a series of spaced-apart rest members, one of which is displaceable, said members including shanks radiating from said seat and enlargements formed to bear on the inner surface of the tread portion of the shoe, said seat and the shank of the displaceable member being detachably engaged and provided with complemental parts whereby the said shank may be clamped to the seat, and the seat being provided with an aperture permitting the radial longitudinal displacement and partial rotation of said member to collapse the rest formed by the series of members.

5. A spare tire carrier comprising an annular seat for the edges of a tire shoe, a series of spaced-apart rest members, one of which is displaceable, said members including shanks radiating from said seat and enlargements formed to bear on the inner surface of the shoe, the seat being provided with a keyhole slot, and the shank of the displaceable member being provided with a shoulder formed to pass through the larger portion of said slot and overlap the edges of the smaller portion thereof, and with a threaded portion extending through said slot, and a nut engaged with said threaded portion and adapted to clamp said member to the seat, the displaceable member being laterally movable in said slot, and longitudinally movable in the larger portion thereof to collapse the rest formed by the series of members.

6. A spare tire carrier comprising an annular seat for the edges of a tire shoe, a series of spaced-apart rest members, one of which is displaceable, said members including shanks radiating from said seat and enlargements formed to bear on the inner surface of the shoe, the seat being provided with a keyhole slot, and the shank of the displaceable member being provided with a shoulder formed to pass through the larger portion of said slot and overlap the edges of the smaller portion thereof, and with a threaded portion extending through said slot, and a nut engaged with said threaded portion and adapted to clamp said member to the seat, the shank of the displaceable member being provided with notches adapted to engage the edges of the smaller portion of said slot, and prevent rotation of the said member.

7. A spare tire carrier comprising an annular seat for the edges of a tire shoe, a series of spaced-apart rest members, one of which is displaceable, said members including shanks radiating from said seat and enlargements formed to bear on the inner surface of the shoe, the seat being provided with a keyhole slot, and the shank of the displaceable member being provided with a shoulder formed to pass through the larger portion of said slot and overlap the edges of the smaller portion thereof, and with a threaded portion extending through said slot, and a nut engaged with said threaded portion and adapted to clamp said member to the seat, the said threaded portion being provided with an orifice adapted to engage a padlock, whereby the rest formed by the series of members may be locked in an expanded condition.

8. A spare tire carrier comprising an annular seat for the edges of a tire shoe, having means for engagement with a vehicle body, a series of spaced-apart rest members having shanks engaged with said seat and oblong enlargements formed to bear on the inner surface of the tread portion of the shoe, one of said members being radially displaceable against the seat, the seat being provided with a slot formed to permit successive lateral, rotary and radial longitudinal movements of said member, and the shank of said member being provided with clamping means and with locking means normally preventing lateral movement of the member.

9. A spare tire carrier comprising an annular seat for the edges of a tire shoe, a series of spaced-apart rest members having shanks engaged with said seat and oblong enlargements formed to bear on the inner surface of the shoe, one of said members being displaceable, the seat being provided with a keyhole slot and the shank of the displaceable member having a shoulder formed to pass through the larger portion of the slot and overlap the edges of the smaller portion thereof, and a threaded portion extending through said slot, a nut engaged with said threaded portion and adapted to clamp said member to the seat, the displaceable member being laterally movable in said slot and longitudinally movable in the larger portion thereof, and a locking washer interposed between said nut and the seat and having an ear adapted to project into said slot and prevent lateral movement of said member.

In testimony whereof I have affixed my signature.

FREDERICK G. PARKER.